(12) United States Patent
Moscardi et al.

(10) Patent No.: US 8,519,054 B2
(45) Date of Patent: Aug. 27, 2013

(54) CROSSLINKABLE THERMOPLASTIC OLEFIN ELASTOMERS AND CROSSLINKED THERMOSET OLEFIN ELASTOMER OBTAINED THEREFROM

(75) Inventors: Gilberto Moscardi, Ferrara (IT); Enrico Costantini, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 323 days.

(21) Appl. No.: 12/734,277

(22) PCT Filed: Sep. 29, 2008

(86) PCT No.: PCT/EP2008/063029
§ 371 (c)(1),
(2), (4) Date: Apr. 22, 2010

(87) PCT Pub. No.: WO2009/053222
PCT Pub. Date: Apr. 30, 2009

(65) Prior Publication Data
US 2010/0249256 A1    Sep. 30, 2010

Related U.S. Application Data

(60) Provisional application No. 61/000,944, filed on Oct. 30, 2007.

(30) Foreign Application Priority Data

Oct. 22, 2007 (EP) ..................................... 07118963

(51) Int. Cl.
*C08F 8/00* (2006.01)
*C08J 9/00* (2006.01)

(52) U.S. Cl.
USPC ............... 525/101; 525/193; 526/90; 521/86; 521/91; 521/154

(58) Field of Classification Search
USPC ..................... 521/134, 86, 91, 154; 525/105, 525/240, 101, 193; 526/91
See application file for complete search history.

(56) References Cited

U.S. PATENT DOCUMENTS

| | | | | |
|---|---|---|---|---|
| 5,741,858 A | * | 4/1998 | Brann et al. | 525/101 |
| 2004/0236032 A1 | * | 11/2004 | Bacci et al. | 525/333.7 |

FOREIGN PATENT DOCUMENTS

| WO | WO 2007-104458 | * | 9/2007 |
|---|---|---|---|
| WO | WO 2007104458 A1 | * | 9/2007 |

* cited by examiner

*Primary Examiner* — Randy Gulakowski
*Assistant Examiner* — Kara Boyle

(57) ABSTRACT

Thermoset polyolefin elastomer obtained by static curing with water a silane-grafted thermoplastic heterophasic polyolefin composition (I) having a flexural modulus equal to or lower than 150 MPa, and comprising: (a) a crystalline propylene homopolymer or copolymer of propylene with up to 15% by weight of ethylene or other alpha-olefin comonomer(s), or their combinations, and (b) a copolymer or a composition of copolymers of ethylene with other alpha-olefins containing from 15% by weight to less then 40% by weight of ethylene; said thermoset polyolefin elastomer having a compression set value of from 30 to 65%, a ratio of elongation at break to compression set values of above 8, and hardness shore A values below 90.

7 Claims, No Drawings

CROSSLINKABLE THERMOPLASTIC OLEFIN ELASTOMERS AND CROSSLINKED THERMOSET OLEFIN ELASTOMER OBTAINED THEREFROM

The present invention relates to cross-linkable thermoplastic olefin elastomers and cross-linked thermoset olefin elastomers obtained therefrom. More particularly, the invention relates to cross-linked thermoset olefin elastomers endowed with superior properties obtained from cross-linkable thermoplastic olefin elastomers after cross-linking in the presence of water. The invention relates also to shaped articles comprising said thermoplastic olefin elastomers before cross-linking and to shaped articles comprising said olefin elastomers after cross-linking.

The polyolefin thermoset elastomers of the present invention have high elongation at break, low compression set values, and low Shore A hardness values. Due to the valuable balance of mechanical properties they are suitable for the manufacture of soft and flexible articles with good elastic properties, and find application in a variety of fields, including the automotive industry, domestic appliances, and the field of components for electrical and mechanical engineering.

The above mentioned characteristics and properties are obtained by subjecting to static cross-linking heterophasic polyolefin compositions which have been silane-grafted, shaped or moulded into shaped articles, and contain crystalline propylene homopolymers or copolymers, and elastomeric olefin polymers with a low ethylene content (less than 40% by weight).

Silane grafted and dynamically cross-linked polyolefin compositions retaining thermoplastic properties are described in the patent literature.

International patent application WO05/005532 discloses a process for making a thermoplastic vulcanizate by alkoxysilane grafting and further dynamical cross-linking of a polyolefin composition in the presence of a water-generating solid agent. Ethylene is the major component in the cross-linkable disperse phase polymer, when it is an ethylene or ethylene-alpha olefin copolymer. High values of elongation at break are never achieved, in the examples, with boric acid used as a water-developing agent.

US patent application 2005/0059783 describes the use of alkoxysilane and peroxides and optionally a condensation catalyst for a dynamical cross-linking process producing thermoplastic vulcanizates starting from polyolefins, particularly polyethylene and copolymers of ethylene. The cross-linking is accomplished using an organo-alkoxysilane, a peroxide and moisture or liquid water. Values of elongation at break below 500% are achieved in the examples.

International patent application WO04/055083 discloses a process for making a thermoplastic vulcanizate by alkoxysilane grafting a polyolefin composition and subsequent addition of a solid water generating cross-linking agent. A blend is obtained in the reactor by mixing a matrix polymer and a resilient polymer with the grafting and cross-linking agents (dynamical cross-linking) in the presence of extender oils to improve processability. Ethylene is the major component of the resilient polymer (interpolymer) and high values of elongation at break are not exhibited by the thermoplastic vulcanizate obtained in the absence of additional fillers.

European patent application EP-A-0633289 discloses soft partially cross-linked polyolefin compositions with a low ethylene content, less than or equal to 35% by weight, having very low flexural modulus values, elongation at break values higher than those of the compositions described for in the previously commented documents, good compression set values and processability, due in particular to the low content of cross-linked elastomer. These partially cross-linked polyolefin compositions are obtained by subjecting the starting material to dynamic cross-linking with organic peroxides and co-agents. Peroxides are used in quantities ranging from 0.5% to 5% by weight, with respect to the total weight of the composition which is subjected to cross-linking. Co-agents are cyanurates, acrylates, benzene or furan derivatives and sulphur donors that are used in quantities ranging from 0.1% to 8% by weight, with respect to the total weight of the composition. Co-agents are substances with a negative environmental impact in addition to the known adverse organoleptic properties of organic peroxides. Indeed, the partially cross-linked polyolefin compositions obtained exhibit a ratio of compression set value versus elongation at break that is still not satisfactory.

The patent literature describes also silane-grafted compositions in which the cross-linking reaction takes place following the shaping or moulding step by reaction between the grafted silane groups and water. The phase of the process during which the cross-links are created is commonly referred to as the "cure phase" and the process itself is commonly referred to as "curing".

U.S. Pat. No. 5,741,858 discloses polyolefin blends comprising a polyolefin elastomer and a crystalline polyolefin grafted with silanes and cured with water to generate cross-links. The crystalline polyolefin is preferably polyethylene or crystalline polypropylene. Various types of polyethylene are disclosed and exemplified. With respect to polypropylene, it is disclosed that it can be either a homopolymer or one or more copolymers of propylene and up to 20 mole % ethylene or at least one α-olefin having up to about 12 carbon atoms. There is only one example of blend of a polyolefin elastomer and crystalline polypropylene (B5). In such example the elastomer used is a bipolymer ethylene/1-octene of undisclosed composition, and the crystalline polypropylene is a polypropylene homopolymer. The patent fails to disclose whether the blend retains a thermoplastic behaviour after curing.

There remains a need for thermoset polyolefin elastomers and shaped articles comprising such elastomers, which are typically insoluble and do not remelt after curing, in particular for the manufacture of soft and flexible articles with good elastic properties for application in a variety of fields, including the automotive industry, domestic appliances, electric and mechanical engineering. It would be particularly desirable to achieve such properties with polyolefin compositions obtained by the sequential polymerization process that will be better described below.

Therefore, the present invention provides a cross-linkable thermoplastic polyolefin elastomer obtained by grafting an alkenyl-substituted alkoxysilane to a heterophasic polyolefin composition (I) comprising:
(a) a crystalline propylene homopolymer or copolymer of propylene with up to 15% by weight of ethylene or other α-olefin comonomer(s), or their combinations; and
(b) a copolymer or a composition of copolymers of ethylene with other α-olefins containing from 15% by weight to less than 40% by weight of ethylene, preferably from 15% to 38%, more preferably from 15 to 35%, in particular from 20 to 38 and more particularly from 20 to 35% by weight of ethylene; said heterophasic polyolefin composition (I) having a flexural modulus equal to or lower than 150 MPa, preferably lower than 100 MPa.

The invention relates also to a cross-linked thermoset polyolefin elastomer obtained by static curing with water said thermoplastic elastomer after the grafting treatment and in absence of further mixing or mastication; typically after it has been shaped into an article.

In the present description the term "thermoset" referred to a polyolefin elastomer means an elastomeric polyolefin composition that is substantially insoluble in boiling Xilene, and cannot be melted or formed into a different shape after curing. Typically the thermoset polyolefin elastomer according to the invention have a MFR measured at 235° C. and 5.0 Kg (condition S) not measurable or in any case of less than 0.01.

Preferably, the α-olefin comonomers in the heterophasic composition (I) are selected from $C_4$-$C_{10}$ alpha-olefins for component (a) and $C_3$-$C_{10}$ alpha-olefins for component (b).

Examples of the above mentioned $C_3$-$C_{10}$ and $C_4$-$C_{10}$ alpha-olefins for the heterophasic composition (I) are propylene, butene-1, pentene-1,4-methylpentene, hexene-1, octene-1. The preferred comonomers are propylene and butene-1.

The preferred comonomer in the propylene copolymers of component (a) is ethylene. When ethylene is the comonomer in component (a) it is preferably present in amounts up to 8% by weight of the component (a).

Preferred comonomers in the ethylene copolymers of component (b) are propylene and/or butene-1.

Preferred are the heterophasic compositions (I) comprising (weight percentages):
1) 5-40% of a propylene homopolymer insoluble in xylene at ambient temperature in an amount of more than 90%, or a copolymer of propylene with ethylene and/or C4-C10 alpha-olefin(s), containing 90% or more of propylene, and being insoluble in xylene at ambient temperature in an amount of more that 80% (component a);
2) 60-95% of an elastomeric fraction of one or more copolymer(s) of ethylene said copolymer(s) containing up to 40% of ethylene, and being soluble in xylene at ambient temperature in an amount of more that 70% (component b)

Particularly preferred are the heterophasic compositions (I) comprising (weight percentages):
1) 5-40% of component (a) as defined above;
2) 60-95% of a fraction of one or more copolymer(s) of ethylene with propylene and/or $C_4$-$C_{10}$ alpha-olefin(s) said copolymer(s) containing from 15 to 40% of ethylene, and being soluble in xylene at ambient temperature (fraction b 1); and
3) 0-30%, with respect to the sum of component (a) and fraction (b 1), of a copolymer fraction containing ethylene, said fraction being insoluble in xylene at ambient temperature (fraction b 2).

When present, said fraction (b 2) preferably exceeds 1% by weight, more preferably ranging from 1 to 25% by weight with respect to the sum of component (a) and fraction (b 1). Preferably the percent by weight of the sum of (b 1) and (b 2) fractions with respect to the weight of the heterophasic polyolefin composition (I) is of from 50% to 90% and the (b 2)/(b 1) weight ratio is lower than 0.4. The content of ethylene in fraction (b 2) is preferably at least 75% by weight, more preferably at least 80% by weight, with respect to the total weight of fraction (b 2). The comonomers in the copolymer fraction (b 2) are preferably the same as those of the copolymer fraction (b 1). An example of copolymer fraction (b 2) is an essentially linear semicrystalline copolymer of ethylene with propylene.

More particularly preferred are the heterophasic compositions (I) comprising (weight percentages):
(a) 5-40% of a propylene homopolymer insoluble in xylene at ambient temperature in an amount of more than 90%, or a copolymer of propylene with ethylene and/or one or more C4-C10 alpha-olefin(s), containing 90% or more of propylene, and being insoluble in xylene at ambient temperature in an amount of more that 80% (component a);
(b) 60-95% of a composition of copolymers of ethylene with propylene and/or one or more C4-C10 alpha-olefin(s), comprising:
(1) a first elastomeric copolymer containing from 15 to 32% by weight of ethylene, preferably from 20 to 30, and having solubility in xylene at ambient temperature greater than 50% by weight, the intrinsic viscosity of the xylene soluble fraction ranging from 3.0 to 5.0 dl/g ((component (b)(1)); and
(2) a second elastomeric copolymer containing more than 32% up to 45% by weight of ethylene, preferably from 35 to 40%, and having solubility in xylene at ambient temperature greater than 80% by weight, the intrinsic viscosity of the xylene soluble fraction ranging from 4.0 to 6.5 dl/g ((component (b)(2));
the (1)/(2) weight ratio ranging from 1:5 to 5:1, preferably from 1:2 to 4:1, and more preferably from 1:1 to 2:1.

The solubility and insolubility of the said polymer components and fractions are defined as fractions soluble or insoluble in xylene at ambient temperature, i.e., around 25° C.

The thermoset polyolefin elastomers obtained by static curing the polyolefin compositions (I) typically exhibit insolubility in boiling Xilene (gel content) of at least 50 units percent higher than the starting thermoplastic heterophasic polyolefin composition (I).

The heterophasic compositions (I) as defined can be prepared by blending component (a) and (b), or component (a) and fraction (b 1) and optionally fraction (b 2), or components (a), (b)(1) and (b)(2) in the molten state, that is to say at temperatures greater than their softening or melting point, or more preferably can be prepared by sequential polymerization in the presence of a highly stereospecific Ziegler-Natta catalyst. In particular, the catalyst system used comprises (i) a solid catalytic component containing a titanium compound and an electron-donor compound, both supported on magnesium chloride, and (ii) an Al trialkyl compound and optionally an electron-donor compound.

Other catalysts that may be used are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823.

These metallocene catalysts may be used in particular to produce the component (b).

The above mentioned sequential polymerization process for the production of the heterophasic composition (I) comprises at least two stages, where in one or more stage(s) propylene is polymerized, optionally in the presence of the said comonomer(s), to form component (a), and in one or more additional stage(s) mixtures of ethylene with said C3-C10 alpha-olefin(s), are polymerized to form component (b).

The polymerization processes are carried out in liquid, gaseous, or liquid/gas phase. The reaction temperature in the various stages of polymerization can be equal or different, and generally ranges from 40 to 90° C., preferably from 50 to 80° C. for the production of component (a), and from 40 to 60° C. for the production of component (b).

Examples of sequential polymerization processes are described in European patent application EP-A-472946 and in WO03/011962.

As a way of example, the heterophasic composition (I) has MFR values ranging from 0.1 to 20 g/10 min, preferably from 0.2 to 15 g/10 min. The heterophasic composition with said melt flow rate values can be obtained directly during the polymerization process; as an alternative, said heterophasic composition can be subjected to a chemical visbreaking process carried out in the presence of the appropriate visbreaking agents, such as peroxides. Said chemical visbreaking process is carried out according to well known methods.

Typically, the total content of polymerized ethylene in the heterophasic composition (I) ranges from 15 to 35% by weight, in particular from 15 to 30% by weight.

The molecular weight of the various components and fractions of the heterophasic composition (I) (determined by measuring the intrinsic viscosity in tetrahydronaphtalene at 135° C.) varies in function of the nature of the components, and the total melt flow rate of the composition. In particular, the intrinsic viscosity is preferably comprised between the following limits: 0.5-3 dl/g for component (a), and 2-8 dl/g for component (b).

The heterophasic composition (I) have haze values generally lower than 40%, preferably lower than 30%.

The thermoset polyolefin elastomer of the present invention exhibit a good balance of mechanical properties, particularly in terms of low compression set values and relatively high elongation at break values. Compression set values typically range from 30 to 65%, preferably from 30 to 45%, elongation at break values are above 350%, and the ratio of elongation at break to compression set values is above 8. In many cases the values of the ratio of elongation at break to compression set are close to or above 10, with definite advantage for injection moulding and compression moulding applications, and particularly for gasket and seals that require low compression sets values and high elongation at break. Hardness shore A values are below 90, preferably below 80, more preferably from 60 to 76.

Moreover, the thermoset elastomers of the present invention are suitable for food application thanks to the reduction of the peroxide amounts required and the elimination of the use of coagents and in some cases also of the hydrolysis catalyst (a Lewis acid, usually an organic tin compound).

The thermoset polyolefin elastomers of the present invention are prepared by a multi-step process.

The first step (i) comprises grafting an alkenyl-substituted alkoxysilane/peroxide agent to a heterophasic polyolefin composition (I) as defined above. The uncross-linked heterophasic polyolefin composition (I) is typically subjected to a mixing process such as an extrusion process adding while mixing a grafting agent. The product of this first step (i) is a cross-linkable thermoplastic olefin elastomer.

Generally, any organoalkoxysilane known in the art can be used as grafting agent for the preparation of the thermoplastic polyolefin elastomer of the present invention. In particular, examples of alkoxysilane monomers are alkenyl-substituted alkoxysilanes, particularly suitable are vinyl-trimethoxysilane (VTMS) and methacryloylpropyl-trimethoxysilane (VMMS). The alkoxysilanes are generally used in quantities ranging from 1% to 10%, preferably from 2% to 7% by weight with respect to the total weight of heterophasic composition (I).

Peroxides used for grafting organoalkoxysilanes onto the polyolefin composition (I) are organic peroxides, preferably having a half-life in the ethylene-propylene-diene rubbers (EPDM) of less then 1 minute at 200° C. Examples of such peroxides are: 1,1'-bis(tert-butylperoxy)-diisopropylbenzene; dicumyl peroxide; n-butyl-4,4'-bis-(tert-butylperoxy)-valerate; 2,5-di(tert-butylperoxy)2,5-dimethylhexane. The peroxides are generally used in amounts ranging from 0.05% to 1%, preferably from 0.1% to 0.8% by weight with respect to the total weight of heterophasic composition (I).

The second step (ii) comprises shaping the silane-grafted cross-linkable thermoplastic elastomer composition obtained in step (i) into an article by any suitable process, e.g. extrusion, injection or compression moulding.

The grafting and shaping steps can be carried out in the same extruder, if desired. Alternatively, the grafted pellets or particles produced in the first step are stored under substantially dry conditions until they are transformed into shaped articles.

The thermoplastic polyolefin elastomers of the present invention can also be foamed, and an additional advantage of the present invention is that from the thermoplastic elastomers one can obtain foamed polyolefin compositions having regularly shaped cells, not collapsed, having excellent mechanical properties (high elongation at break values, for example). Moreover, the products made from the above mentioned foamed polyolefin compositions have a smooth and regular surface.

The density of the foamed polyolefin compositions according to the present invention ranges preferably from 0.2 to 0.6 $g/cm^3$.

To obtain foamed polyolefin compositions one can use processes and foaming agents commonly known in the art. In particular, one can use physical type foaming agents, such as hydrocarbons, optionally fluorinated and/or chlorinated, whose boiling point is above 25° C., for example pentane, hexane, dichlorotrifluoroethanes and methylene chloride, or gaseous or liquid compounds having a boiling point below 25° C., for example air, nitrogen, carbon dioxide, chlorofluoromethane, dichlorodifluoromethane, butane, propane and isobutane. Other foaming agents that can be used are the chemical types which develop gas either by thermal decomposition or by chemical reaction. Examples of chemical foaming agents are: azodicarbamide, barium azodicarboxylate, phenylsulfone, mixtures of sodium bicarbonate and citric acid, sodium borohydrate, gypsum and hydrated aluminas.

To prepare the foamed compositions extruders commonly known in the art can be used, including single-screw extruders. The physical type foaming agent is preferably injected or introduced into the melted polymer mass inside the extruder at a distance from the solid polymer feeding point where said polymer is in the form of a melted and homogeneous mass. The temperature in the section of the extruder where the foaming agent is introduced preferably ranges from 125° C. to 250° C. The chemical type foaming agents can be mechanically blended with the solid polymer before extrusion. The dry blend thus obtained is then introduced into the first feeding area of the extruder, said area being maintained at a temperature from 130° C. to 200° C. The temperature that is maintained at the extruder output, equipped with the proper die, e.g. a die with circular holes or a flat die, has to be adequate for the polymer to foam. Said temperature preferably ranges from 125° C. to 180° C.

The quantity of physical foaming agent which is added to the polymer composition preferably ranges from 0.5% to 30% by weight with respect to the polymer composition, most preferably from 0.5% to 15%. The quantity of chemical foaming agent preferably ranges from 0.2% to 10%, more preferably from 0.3% to 5%.

One can also add to the polymer mass, either before or during extrusion, one or more nucleating agents (cellulation nucleants), in quantities generally ranging from 0.05% to 3% by weight with respect to the polymer. Examples of the above mentioned nucleating agents are talc and colloidal silica.

Other additives, dyes or fillers which may be required can also be added before or after extrusion.

The third step (iii) of the process comprises statically curing the silane-grafted cross-linkable thermoplastic elastomer with water after shaping. Cross-linking is obtained by contacting the composition with hot water (e.g. by immersion) preferably at a temperature above 50° C., more preferably from 60° to 80° C., for few days (1-4) or with moisture in a steam heated ambient (Relative Humidity>80%) for some days (5-10) after shaping, or in a standard atmosphere with 30-70% of Relative Humidity for some weeks (2-5).

A hydrolysis catalyst can be used to promote condensation of the reactive silane side-chains and form strong, stable and flexible —Si—O—Si— cross-links. When used, the hydrolysis catalyst is added to the composition together with the silane/peroxide agent.

Examples of hydrolysis catalyst are a Lewis acid, usually an organic tin compound as DBTL.

Complete hydrolysis of 1 mole of silane requires 3 moles of water. Therefore 1 g of vinyltrimethoxysilane (MW=148.1) is hydrolyzed by 0.365 g of water. 1 g of methacryloxylpropyltrimethoxysilane (MW=248.1) is hydrolyzed by 0.218 g of water.

Mineral fillers, carbon black, dyes, plasticizers, stabilizing agents, extender oils, and all additives in general which are typical of polyolefin compositions containing elastomers, can be added to the composition which is subjected to grafting.

The curing step can be performed directly after the step of shaping the composition into an article, or it can be delayed and performed, for example, by a user before the first use of the article. In this latter case, the article is kept in a substantially water-free atmosphere, typically by suitable packaging, until the curing step is performed.

Delayed curing, or curing prior to use, is of particular interest when the shaped article is a consumer good, for example a container for food or the like. In such case curing with hot water is easily performed by subjecting the shaped article to a wash cycle in a dishwasher.

The curing step results in a cross-linked elastomer composition that is characterised by a thermoset behaviour. Differently from similar compositions that have been dynamically cross-linked, the compositions of the invention in which cross-linking is obtained by curing with water after shaping and solidification of the melt ("static" cross-linking) are substantially insoluble in boiling xylene as above said, and cannot be melted or formed into a different shape after curing.

EXAMPLES

The following examples are given in order to illustrate the present invention.

For the polyolefin elastomer compositions of the present invention, the reported data relative to the properties were determined according to the test methods indicated below.

| Property | Method |
| --- | --- |
| Melt Flow Rate (MFR) | ISO 1133 (230° C./2.16 kg), except where differently specified; |
| Density | ASTM D 3575/W |
| Solubility in xylene | (see note below). |
| Flexural modulus | ISO method 178 with speed of 2 mm/min., on injection moulded specimens 4 mm thick, 80 mm long, 10 mm wide, injection moulded according to ISO 294; |
| Tensile elongation at break | ISO 527/-1, -2 with speed of 500 mm/min., on specimens (type V) cut from 2 mm thick plaques; |
| Compression set | ASTM D 395 method B |
| Hardness (Shore A) | ASTM D-2240 |
| Haze | ASTM D 1003 on injection molded specimens |
| (Tm and ΔH) | 1 mm thick determined via DSC according to ISO 11357-3 |

Note:
solubility in xylene (XS) at ambient temperature
2.5 g of polymer are dissolved in 250 ml of xylene, at 135° C., under agitation. After 20 minutes, the solution is cooled to 25° C. under stirring, and then it is allowed to settle for 30 minutes. The precipitate is filtered with filter paper; the solution is evaporated under a nitrogen current, and the residue dried under vacuum at 80° C. until constant weight. The weight percentage of polymer soluble in xylene at ambient temperature (Xylene Solubles - XS) is then calculated. The percent by weight of polymer insoluble in xylene at ambient temperature is considered the isotactic index of the polymer. This value corresponds substantially to the isotactic index determined by extraction with boiling n-heptane, which by definition constitutes the isotactic index of polypropylene.
insolubility in boiling xylene (gel content)
0.5 g of sample are added to 100 ml of o-xylene in a glass flask, and the related solution is heated at 135° C. for at least an hour, under agitation. Then the hot solution (135° C.) is quickly put in a constant-temperature cylinder at 135° C. equipped with a special filtering set (or put in a filtering oven-device), made with: some small glass spheres, sintered steel disk (d = 47 mm, 1.3 mm thick, porosity PO5 o PO9), a teflon filtering membrane, a glass filtering membrane. By filtration (if necessary a light nitrogen pressure could be applied), the insoluble fraction of the sample at 135° C. is separated from the solution, which is collected in another flask. Then 50 ml of filtered solution are completely evaporated and dried, on a heating plate at 140° C. under a nitrogen flow, and the soluble fraction of the polymer at 135° C. is collected and weighed.
% insoluble at 135° C. (gel content) = 100 − [2 × P × 100)]/Pi
wherein P = soluble fraction collected in 50 ml (g)
Pi = total amount of the sample (0.5 g)

Example 1

An heterophasic polyolefin composition (I) (composition (A) in table 1), obtained by sequential copolymerization in the presence of a high-yield and highly specific Ziegler-Natta catalyst supported on magnesium chloride, was used. Said composition contained the following components (percentages by weight):
(a) 15% of a crystalline copolymer of propylene with ethylene, containing about 3% of ethylene;
(b)(1) 52% of a first elastomeric propylene/ethylene copolymer containing about 28% of ethylene, having a solubility in Xilene at ambient temperature of 89%;
(b)(2) 33% of a second elastomeric propylene/ethylene copolymer containing 38% of ethylene, having a solubility in Xilene at ambient temperature of 92%.

The above composition (I) have the properties reported in table 1, measured with the previously described methods.

Grafting was carried out operating in a Brabender mixer Plasticorder PL 2100. Composition (I) and the additives indicated in Table 2 were fed in the mixer.

In the grafting step:
the peroxide masterbatch Trigonox 101/50 (2,5-bis(tert-butylperoxy)-2,5-dimethylhexane, DHBP, 50% on silica carrier) from Akzo Chemicals;
the alkoxysilane VTMS A-171 by OSI specialties (Crompton); and
the hydrolysis catalyst di-n-butyl-tin-dilaurate (DBTL) by ACIMA.
were mixed with composition (I) before loading them into the mixing chamber. The temperature was set at 160° C. and the blade speed at 60 revolutions per minute (RPM). The silane grafting was carried out for 8 minutes.

The grafted cross-linkable thermoplastic elastomer composition so obtained was compression moulded in order to obtain plaques 2.5 mm thick. The molten polymer mass was placed between two plates and preheated for 5 minutes at T=180° C. A pressure of 100 bars was then applied and the sample held for further 5 minutes at the same temperature. Then, the plaques were placed between two water-cooled press plates to quench the sample.

Curing to generate cross-links was obtained by immersing the plaques in hot-water (60-70° C.) for 3 days.

The cross-linked elastomer had a thermoset behaviour, namely was substantially insoluble in boiling xylene and could not be melted or formed into a different shape after curing.

The amounts of composition (I) and additives (weight percentages) and the properties of the cross-linked thermoset elastomer composition obtained are reported in Table 2.

Example 2

Example 1 was repeated by using VMMS as grafting agent instead of VTMS, and in a different amount in order to have the same molar amount of silane as in example 1.

The amounts of composition (I) and additives (weight percentages) and the properties of the cross-linked thermoset elastomer composition obtained are reported in Table 2.

Example 3

Example 1 was repeated without using any hydrolysis catalyst.

The amounts of composition (I) and additives (weight percentages) and the properties of the cross-linked thermoset elastomer composition obtained are reported in Table 2.

Example 4

Example 1 was repeated by using heterophasic polyolefin composition (I) (composition (B) in table 1) comprising:
1) 31.6% of a crystalline copolymer of propylene with ethylene, containing about 3% of ethylene; 2) 68.4% of an elastomeric propylene/ethylene copolymer containing about 27% of ethylene having a solubility in Xilene at ambient temperature about 88% wt.

The above composition (I) have the properties reported in table 1, measured with the previously described methods.

The amounts of composition (I) and additives (weight percentages) and the properties of the cross-linked thermoset elastomer composition obtained are reported in Table 2.

Example 5

Example 4 was repeated by using VMMS as grafting agent instead of VTMS, and in a different amount in order to have the same molar amount of silane as in example 4.

The amounts of composition (I) and additives (weight percentages) and the properties of the cross-linked thermoset elastomer composition obtained are reported in Table 2.

Comparative Example 6

Example 1 was repeated by using the following composition
24% of crystalline propylene homopolymer;
76% of a elastomeric propylene/ethylene copolymer containing about 46% of ethylene;
The amounts of this composition (composition (C) in table 2) and additives (weight percentages) and the properties of the cross-linked composition obtained are reported in Table 2.

Comparative Example 7

Example 2 was repeated by using dinamical conditions also for the crosslinking step.

The grafting was carried out operating as in example 2 in a Brabender mixer Plasticorder PL 2100. In the grafting step:
the peroxide masterbatch Trigonox 101/50 (2,5-bis(tert-butylperoxy)-2,5-dimethylhexane, DHBP, 50% on silica carrier) from Akzo Chemicals;
the alkoxysilane VMMS A-174 NT by GE Silicones; and
the hydrolysis catalyst di-n-butyl-tin-dilaurate (DBTL) by ACIMA.
were mixed with composition (A) before loading them into the mixing chamber. The temperature was set at 160° C. and the blade speed at 60 revolutions per minute (RPM). The silane grafting was carried out for 8 minutes.

The crosslinking step was then carried out dynamically just after the grafting step by adding boric acid as water-developing agent in the same Brabender and further mixing for 10 minutes.

The amounts of this composition and additives (weight percentages) and the properties of the cross-linked composition obtained are reported in Table 2 below.

TABLE 1

| Property | Composition (B) of examples 4-5 | Composition (A) of examples 1-3 |
|---|---|---|
| Melt Flow Rate (MFR) (g/10 min) (230° C./2.16 Kg) | 0.6 | 0.6 |
| Elongation at break (%) | 900 | 1000 |
| Flexural modulus at 23° C. (MPa) | 80 | 20 |
| Compression set (%)(22 h-70° C.) | 90 | 85 |
| Shore A - Hardness | 90 | 78 |
| Haze (%) - 1 mm thick plaques | 30 | 38.1 |
| XS (%) | 67 | 76 |
| gel content (%) (o-xilene, 135°) | 2.1 | |
| Tm (° C.) | 139.8 | 139.5 |
| ΔH (J/g) | 24.2 | 16.5 |

TABLE 2

| Composition (% by weight) | Ex. 1 | Ex. 2 | Ex. 3 | Ex. 4 | Ex. 5 | C. Ex. 6 | C. Ex. 7 |
|---|---|---|---|---|---|---|---|
| Composition (A) | 96.6 | 94 | 93.2 | | | | 92.3 |
| Composition (B) | | | | 96.6 | 94 | | |
| Composition (C) | | | | | | 96.7 | |
| Composition (D) | | | | | | | |
| Peroxide | 0.3 | 0.3 | 0.6 | 0.3 | 0.3 | 0.3 | 0.3 |
| Silane | 3.1 | 5.7[a] | 6.2 | 3.1 | 5.7[a] | 3.0 | 5.7[a] |
| catalyst (DBTL) | 0.07 | 0.11 | — | 0.07 | 0.11 | 0.08 | 0.11 |
| B(OH)$_3$ | | | | | | | 1.6 |
| Silane/peroxide | 19.3 | 19 | 19.3 | 19.3 | 19 | 19.3 | 19 |
| Silane/catalyst | 44.2 | 50 | No cat. | 44.2 | 50 | 36.8 | 50 |
| Property after curing | | | | | | | |
| Compression set % | 34 | 43 | 44 | 47 | 59 | 33 | 52 |
| Stress @ break | 7.8 | 8.8 | 9 | 16 | 15.8 | 10.7 | |
| Elongation @ break | 400 | 600 | 395 | 660 | 780 | 224 | 760 |

TABLE 2-continued

| Composition (% by weight) | Ex. 1 | Ex. 2 | Ex. 3 | Ex. 4 | Ex. 5 | C. Ex. 6 | C. Ex. 7 |
|---|---|---|---|---|---|---|---|
| Hardness Shore A | 75 | 69 | 74 | 87 | 87 | 85 | 78 |
| Elongation @ break/ Compression set % | 11.7 | 14 | 9 | 14 | 13.2 | 6.8 | 14.62 |
| gel content (o-xilene, 135°) | 89.7 | 94.6 | — | — | — | — | 86.2 |
| MFR-S (235° C./5.0 Kg) | <0.01 | <0.01 | <0.01 | <0.01 | <0.01 | <0.01 | 0.03 |

The examples above show that a polyolefin elastomer compositions of examples 1-5 exhibit a thermoset behaviour associated to good tensile properties and softness. The balance between elongation at break and compression set is excellent, as shown by their ratio, which is always above 10 with the exception of example 3, where no hydrolysis catalyst was used. Comparative example 6 shows that the use of an elastomeric copolymer component with more than 40% of ethylene, instead of an elastomeric copolymer according to the present invention, reduces dramatically the elongation at break and the ratio of elongation at break/compression set.

Comparative example 7 shows that dynamic cross-linking of the heterophasic polyolefin composition (I) leads to a substantially different balance of properties particularly higher compression set values and hardness shore A are obtained compared to the same material statically cured. Furthermore dynamically curing lead to a thermoplastic material exhibiting a low but measurably higher MFR-S compared to the cross-linked thermoset polyolefin elastomer of the invention.

The invention claimed is:

1. Thermoset polyolefin elastomer obtained by static curing with water a silane-grafted thermoplastic heterophasic polyolefin composition (I) having a flexural modulus equal to or lower than 150 MPa, and comprising:
   (a) 5-40 weight % of a propylene homopolymer insoluble in xylene at ambient temperature in an amount of more than 90%, or a copolymer of propylene with at least one of ethylene and $C_4$-$C_{10}$ alpha-olefin(s), containing at least 90% of propylene, and being insoluble in xylene at ambient temperature in an amount of more that 80% (component a);
   (b) 60-95 weight % of a composition of copolymers of ethylene with at least one of propylene and $C_4$-$C_{10}$ alpha-olefin(s), comprising:
   (1) a first elastomeric copolymer containing from 15 to 32% by weight of ethylene, and having solubility in xylene at ambient temperature greater than 50% by weight, the intrinsic viscosity of the xylene soluble fraction ranging from 3.0 to 5.0 dl/g; and
   (2) a second elastomeric copolymer containing more than 32% up to 45% by weight of ethylene, and having solubility in xylene at ambient temperature greater than 80% by weight, the intrinsic viscosity of the xylene soluble fraction ranging from 4.0 to 6.5 dl/g;
   the (1)/(2) weight ratio ranging from 1:5 to 5:1,
   said thermoset polyolefin elastomer having a compression set value of from 30 to 65%, a ratio of elongation at break to compression set values of above 8, and hardness shore A values below 90.

2. Thermoset polyolefin elastomer according to claim 1, characterized by elongation at break values above 350%.

3. Thermoset polyolefin elastomer according to claim 1, characterized by a value of MFR-S of less than 0.01 g/10 min, measured at 235° C., 5.0 Kg.

4. Thermoset polyolefin elastomer according to claim 1, characterized in that said heterophasic composition (I) is prepared by sequential polymerization in the presence of a highly stereospecific Ziegler-Natta catalyst.

5. Shaped articles comprising the thermoset polyolefin elastomer of claim 1.

6. Shaped articles according to claim 5, in form of films or flexible foils, injection molded articles or extruded section articles.

7. The thermoset polyolefin elastomer of claim 1 wherein component (b)(1) is present in an amount from 20 to 30 wt % and component (b)(2) is present in an amount from 35 to 40 wt %.

* * * * *

UNITED STATES PATENT AND TRADEMARK OFFICE
CERTIFICATE OF CORRECTION

PATENT NO. : 8,519,054 B2  
APPLICATION NO. : 12/734277  
DATED : August 27, 2013  
INVENTOR(S) : Gilberto Moscardi et al.

Page 1 of 1

It is certified that error appears in the above-identified patent and that said Letters Patent is hereby corrected as shown below:

On The Title Page,  
Column 1, Item (73)  delete "Basell Polyolefine GmbH, Wesseling (DE)" and insert  
-- Basell Poliolefine Italia S.r.l., Milano (IT) --

Signed and Sealed this  
Twenty-sixth Day of July, 2016

Michelle K. Lee  
*Director of the United States Patent and Trademark Office*